Dec. 17, 1935.　　　P. M. BOURDON　　　2,024,845
DEVICE FOR USE IN OPERATING TRACK RELAYS IN RAILWAY SIGNALING SYSTEMS
Filed Dec. 15, 1933　　　2 Sheets-Sheet 1
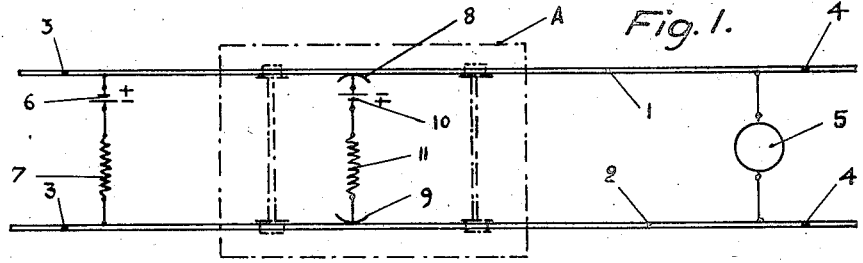
Fig. 1.
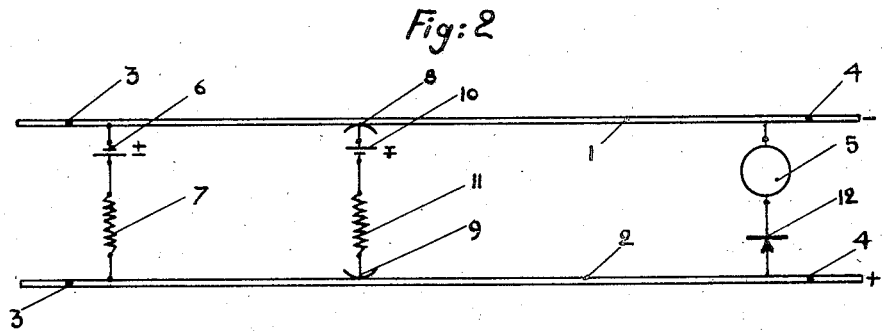
Fig: 2
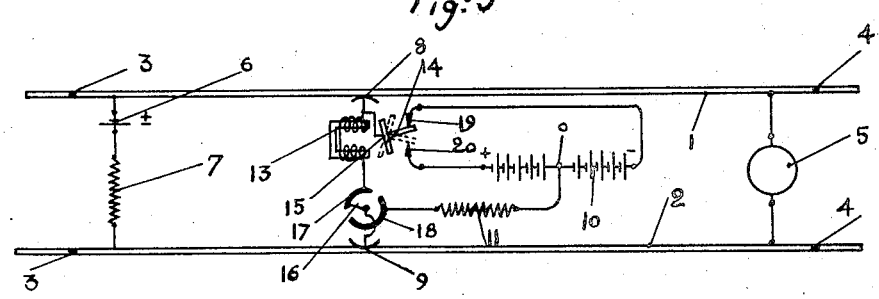
Fig: 3
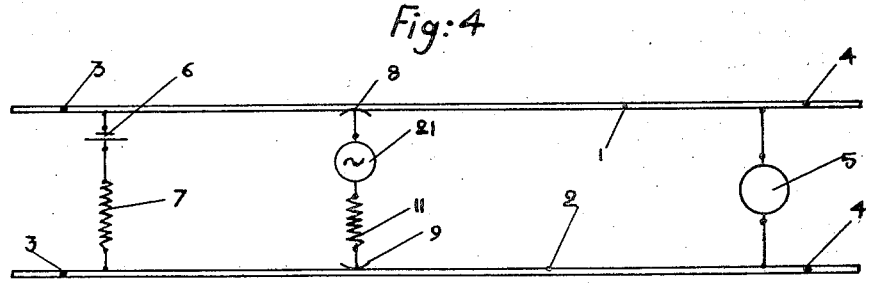
Fig: 4
INVENTOR
Pierre M. Bourdon
BY Townsend + Decker
ATTORNEYS.

Dec. 17, 1935. P. M. BOURDON 2,024,845
DEVICE FOR USE IN OPERATING TRACK RELAYS IN RAILWAY SIGNALING SYSTEMS
Filed Dec. 15, 1933 2 Sheets-Sheet 2
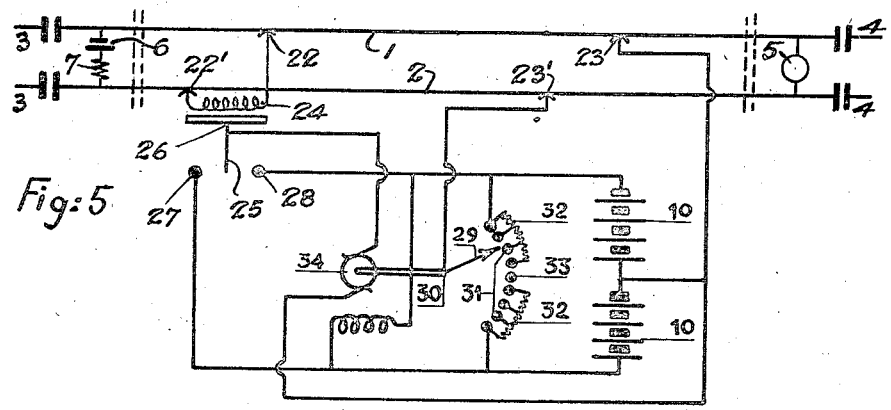
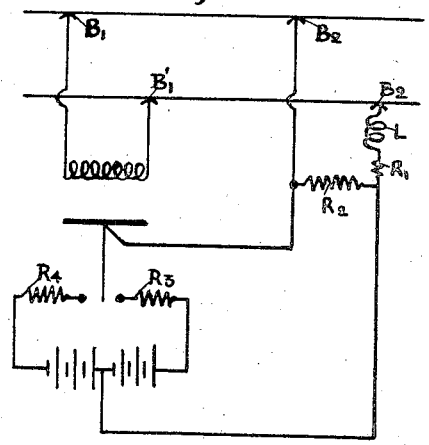
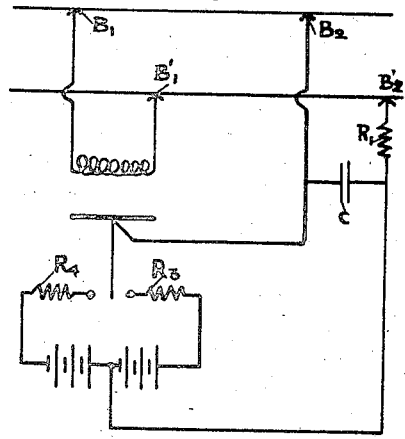
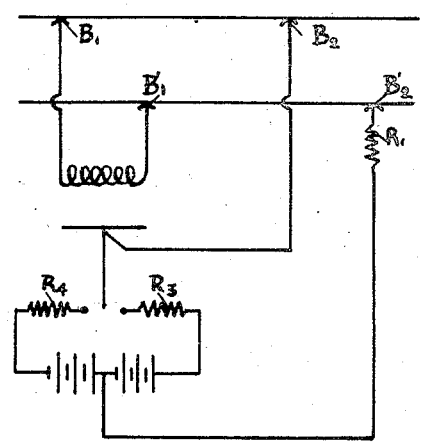
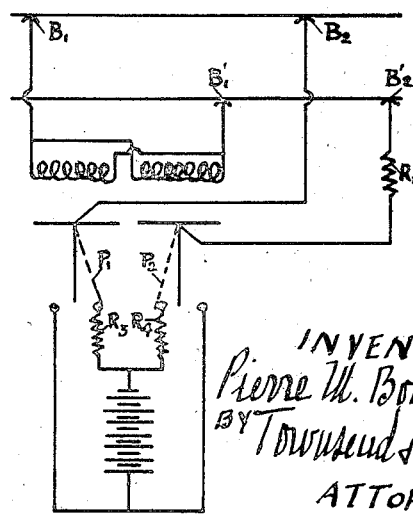
INVENTOR
Pierre M. Bourdon
BY Townsend & Decker
ATTORNEYS Patented Dec. 17, 1935

2,024,845

UNITED STATES PATENT OFFICE 2,024,845

DEVICE FOR USE IN OPERATING TRACK RELAYS IN RAILWAY SIGNALING SYSTEMS

Pierre Marcel Bourdon, Paris, France, assignor to Michelin & Cie, Clermont-Ferrand, France, a corporation of France Application December 15, 1933, Serial No. 702,445
In France June 28, 1933

4 Claims. (Cl. 246—41)

Signaling apparatus for railways is controlled by track relays arranged in circuit with the rails forming a portion or section of the track which circuit includes a source of electric current, (usually a battery) and a resistance.

Each track relay is normally energized, but when a train enters the section of track considered, the wheels and axles of the train cause a shunt of the corresponding relay which becomes deenergized, thereby bringing about actuation of the signals.

Now light vehicles (motor carriages, cycle trolleys, etc.) which can be used on metal rails and also wagons fitted with rubber tires e. g. those known as "Michelines" do not cause sufficient shunting effect, with the result that there is no exciting effect on the relays and in consequence the signal is not actuated when they enter a track section.

The main object of the present invention is to provide devices which will enable light vehicles, or vehicles with rubber tires, also to have a shunting effect on the track relays.

There is provided the setting up, during that time when the vehicle is passing through a track section, in the relays of this section, of an electric current sufficient to neutralize the effect of the current that normally causes excitation of the track relay under consideration, and causing the difference of potential across the terminals of this relay to fall below the minimum necessary for its release.

For this purpose the vehicle is provided with a source of electricity and means such as brushes, skids or the like adapted to pass to the rails of the track, a supplementary current, which annuls the effect of the permanent current in the circuit of the particular track section.

In order to respond to the different conditions which may arise in practice, one or more of the following features may be applied.

(a) Sufficiently high values are given to the electromotive force of the permanent current source and to the resistance or to the self inductance on the vehicle, to render the resistances due to the contact of the transmitting brushes negligible.

(b) The ratio between the electromotive force of the feeding source of the track relays and the value of the resistance in series with this source is arranged to be constant for all sections of the track so that the ratio between the electromotive force of the source of current on the vehicle and the value of the resistance on the vehicle can be made equal to this constant.

(c) The constant as represented by the ratio between the electromotive force of the source of current on the vehicle, and the value of the resistance on the same vehicle has a value which exceeds the known maximum of the constant as represented by the ratio between the electromotive force of the feeding source of the track relays and the value of the resistance in series with this source, and at the same time the track relays are polarized by means of any suitable type of valve.

(d) On the vehicle there is connected up between the two transmitter brushes a reversing relay and a rotary commutator conveniently connected to the brushes as well as to the source of current and to the resistance so as to render possible the automatic variation of the direction of the current intended to neutralize in the rails the normal feeding current of the track relays according to the polarity of the said rails.

(e) On the vehicle, there is inserted, between the two transmitting brushes, a resistance and a source of alternating current whose electromotive force and periodicity are suitably chosen. Upon the normal direct feeding current of the track relays is superimposed an alternating current, of such a value that minima of total current fall below the "drop away" value, thus permitting the track relays to release, while maxima of total current are not of sufficient duration to reenergize the said relays.

(f) In the device visualized in the preceding paragraph the source of alternating current and the resistance are replaced by the secondary of a transformer and by a self inductance.

(g) On the vehicle there is inserted between a primary pair of brushes hereinafter called the primary brushes, an auxiliary relay and between another pair of brushes hereinafter called compensating brushes a source of current and a system of variable resistances placed into circuit by a movable member, in such a manner, that, according to the polarity of the track relays, the armature of the auxiliary relay closes one or the other of the two circuits and permits, on the one hand the movable member to be actuated by the intermediary of any suitable electric motor actuated by the source of current for example, and on the other hand this current source to set up in the rails an opposition current which progressively increases and which automatically ceases to increase when it has attained the desired value permitting the track relay to function. On leaving each track section the movable member automatically returns to its original position and the auxiliary relay to its inactive position.

(h) Instead of employing a single pair of brushes connected sometimes to the auxiliary relay, and sometimes to the source of current by the commutator, (which has for its object to avoid the fall of potential at the brushes' contact acting upon the relay when the source passes current to the track, and of permitting the said relay to be controlled by the true polarity of the rail), two pairs of brushes or two insulated groups of plates or groups of brush elements are employed on the same pair of brushes one of the groups being connected permanently to the auxiliary relay and the other being connected to the source through the intermediary of the same relay.

The auxiliary relay is thus fed by the real difference of potential between the rails, which also acts upon the relays of the railroad companies. As it is always fed, sensitivity is gained. As this method permits the rotary commutator to be eliminated simplicity is gained.

(i) On the other hand, the relay can be used to make connection with the source in such a manner as to cause to vary either the magnitude of the auxiliary current or its duration so as to obtain a difference of potential having a mean value of zero between the rails. There is thus introduced an automatic control and efficiency is gained.

In one method of construction the auxiliary rocking relay connects the source to the second group of brushes, either in one direction or another according to the polarity of the rail and a self inductance placed in series, or a capacity placed in shunt is utilized to obtain a progressive establishment of the current passed to the track.

In a second method the self inductance and the capacity are dispensed with only maintaining the protective resistances.

A modification of the above methods of construction consists in using in place of the rocking relay two relays having a block or rest contact and sensitive to currents of reverse direction. Thus the perpetual surging of the relays is avoided, these relays only functioning on a polarized track. The oscillation of the potential of the track is no longer symmetrical, taking place between the operating and releasing values of either one of the auxiliary relays.

In the attached drawings there is diagrammatically represented by way of example various methods of constructing the devices of the invention.

In these drawings:

Figure 1 is a diagram illustrating the invention in its most simple form.

Figure 2 is a view showing an arrangement similar to that of Fig. 1 but having a polarized relay.

Figure 3 is an analogous view of an arrangement suitable in the case of a track section of any polarity.

Figure 4 indicates the application of the invention by means of an alternating current.

Figure 5 likewise corresponds to the case of a track section with varying polarity.

Figure 6 is a view similar to Fig. 5 but showing a modification.

Figure 7 shows another modification.

Figure 8 is again an analogous view of a new modification.

Figure 9 corresponds to another modification, in which two auxiliary relays are employed.

In Figure 1, 1 and 2 are the two rails of metal track, 3 and 4 the joints which insulate one portion of these rails forming a section of the track; 5 an ordinary track relay, 6 its feeding battery, 7 a resistance.

According to the invention there are arranged on the vehicle indicated at A in dot and dash lines two transmitting brushes 8 and 9, which frictionally engage the rails 1 and 2, and which are connected to a source of continuous current 10 (a battery for example) and to a resistance 11 placed in series.

If $x$ and $y$ are the resistances due to the contact of the brushes 8 and 9, and $w$ is the resistance of the relay 5 and U the difference of potential at its terminals, $E_1$ and $E_2$ are the electromotive forces of the batteries 8 and 10 respectively and $R_1$ and $R_2$, the values of the resistances 7 and 11 respectively there results according to Kirchoff's equations:

$$U\left(\frac{1}{R_1}+\frac{1}{R_2+x+y}+\frac{1}{w}\right)=\frac{E_1}{R_1}-\frac{E_2}{R_2+x+y}$$

In order to have $U=0$ (which will bring about the release of relay 5) it will be sufficient that $$\frac{E_2}{R_2+x+y}=\frac{E_1}{R_1}$$

but since $x$ and $y$ are variable, equality cannot be produced in all cases.

However as in fact it is sufficient that U lies between $\pm E$ (E being less than the minimum electromotive force that will cause release of a track relay, that is to say less than 0.08 volts in the case of track relays used on the French railways) it will be sufficient to make $E_2$ and $R_2$ sufficiently large so that the resistances of contacts $x$ and $y$ of the brushes 8 and 9 are negligible with respect to $R_2$ and equality is practically attained.

One first arrangement according to the invention then consists in so working it that in all the track sections $$\frac{E_1}{R_1}=\text{a constant } K,$$

and that the source of current 10 and resistance 11 of the vehicle A are chosen so that:

$$\frac{E_2}{R_2}=\frac{E_1}{R_1}=K.$$

If $E_2$ and $R_2$ are sufficiently large, as it has been seen above and if the polarity of the rails 1 and 2 of the track is known and always the same from one track section to another, the track relays such as 5 will release on the passage of a light vehicle A thus equipped over the track sections.

Also instead of making $$\frac{E_1}{R_1}$$

a constant in all track sections, $$\frac{E_2}{R_2}$$

may simply be made larger than the greatest known value of $$\frac{E_1}{R_1}.$$

In this case the current emitted by the source 10 will tend to pass through the relay 5 in the direction opposite to the direction of the current coming from the battery 6; if care is taken to polarize this relay by a copper oxide or other valve 12 of any known type (as indicated in Figure 2) which only allows current to pass in the direction of the current coming from the battery 6, and which does not allow current to pass in the opposite direction, no current will any longer pass through the relay 5 which will release on the passage of the vehicles A over the track section under consideration. This arrangement always supposes that the polarity of the rails is known and is always the same from one track section to another.

Now in practice, the rails are often of any polarity. To take this fact into account, the arrangement of Figure 3 may be used.

Between the brushes 8 and 9 of the vehicle A there are inserted on the one hand a reversing relay of the Baudot or like type, of which 13 is the coil and 14 the rocker pivoted at 15 (both jointed to the brush 8) and on the other hand a rotating contact, whose movable member 16 is connected to the brush 9 and whose fixed contacts 17 and 18 are connected respectively to the winding 13, and through the intermediary of the resistance 11 to the middle point 0 of the source 10, of which the positive and negative poles are connected to the two fixed contacts 19 and 20 of the reverser.

If the rail 1 is of positive polarity, the rocker 14 comes into contact with 19 and connects the negative pole of the battery 10 to the brush 9.

When the movable contact member 16 is on the fixed contact 18 the opposed current intended to cause release of the relay 5 is established through brush 8—rocker 14—contact 19—upper part of the battery 10—middle point 0—resistance 11—fixed contact 18—member 16—brush 9.

When the movable contact member 16 is on the fixed contact 17, the circuit passes directly from the brush 8 to the brush 9 through the winding 13 of the reverser. If the polarity of the rail 1 remains the same (the vehicle A has been able in the meantime to change its section of the track) the rocker 14 does not move. But if the polarity of the rail 1 is changed, the rocker 14 rocks and comes into contact with 20, reversing thus the direction of the current in the opposition circuit which is established through: brush 9—member 16—fixed contact 18—resistance 11—middle point 0—lower portion of the battery 10—contact 20—rocker 14—brush 8.

In order to secure sensitive functioning of the device, it is necessary for the reverser to be more sensitive than the track relay 5 because during the period of time T1 during which the movable brush 16 remains on the fixed contact 17 (to detect the polarity of the rails and to cause suitable positioning of the rocker 14) the track relay 5 receives the normal current of the battery 6. This time T1 should therefore be less than the time required for the battery 6 to be capable of re-energizing the track relay (of the order of 15/500 of a second in practice) but greater than the time necessary for the reverser to be actuated and its rocker oscillated (of the order of 1/500 of a second in practice).

Moreover the time T2, during which the brush 16 of the rotating contact will be in contact with the fixed contact 18 must be greater than the time taken for the release of the track relay 5.

This arrangement of Figure 3 can equally well be applied to the case when $$\frac{E_2}{R_2} = \frac{E_1}{R_1} = K$$

as to the case $$\frac{E_2}{R_2} > \frac{E_1}{R_1}.$$

In this case there may be an oxicopper protective member, as visualized in Figure 2, or the speed of the rotary commutator may be fixed so that the opposing current passes during a suitable period of time, which is greater than the time of release and less than the time of energizing.

Finally as shown in Figure 4 the source 10 (see Fig. 1) of continuous current may be replaced by a source of alternating current 21, of periodicity T greater than the time necessary to release the track relay 5 but less than the time necessary to its re-energization. The normal current of the battery 6 is thus neutralized during this time T, which is sufficient to produce the release of the relay 5, and re-establish, and even re-inforced during an equal time T, which is however insufficient to permit re-energization of the relay; this latter will thus be and remain de-excited while the vehicle A is in the corresponding track section.

In this case, it will be sufficient to have $$\frac{E_2}{R_2} > \frac{E_1}{R_1}$$

since, even if the current passes in the reverse direction in the track relay, the time T will be insufficient to permit it to be excited under the effect of the reverse current.

Obviously, instead of a bridge 8—9 (Figure 4) in the form of an alternator and a resistance, the secondary of a transformer and a self inductance, both of low resistance can be employed. The resistance should be sufficient to ensure that the output intensity does not exceed the constant $$\frac{E_2}{2},$$

which permits the advantages of short circuiting of the bridge to be used and to add them to those of the alternating current.

In the embodiment shown in Figure 5 the light vehicle carries two pairs of rubbing brushes (or two groups of insulated plates on a single pair of brushes) 22—22' and 23—23'.

The brushes (or plates) 22—22' constitute the primary brushes and the brushes (or plates) 23—23', constitute the compensating brushes.

Between the primary brushes 22—22' an auxiliary relay 24 is mounted, whose armature 25 pivoted at 26 can take up three different contact positions respectively with the fixed contacts 27 or 28 or an intermediate position between the two.

One of the compensating brushes 23 is connected to the middle point of the battery 10, whose positive and negative poles are respectively connected to the fixed contacts 27 and 28 of the relay 24; the other compensating brush 23' is connected to the end of a slider 29 pivoted at 30, and which moves along contact studs 31 connected through the intermediary of resistances 32 to the positive and negative poles of the battery 10, and separated by an insulating block 33; the amount of the resistance thus provided between the slider and the positive or negative pole of the battery is then smaller and smaller as the slider moves over the studs 31. The successive elements of the battery 10 may also be connected to the blocks 31.

The slider 29 is operated by a direct current motor 34, controlled by the relay 24 and fed by the battery 10.

Let U indicate the potential difference between the rails 1—2 and $u$ the electromotive force for the operation of the relay 24 (0.1 volt for example). According to whether the potential difference U between the rails is greater than $+u$, less than $-u$ or is a value between $-u$ and $+u$, the armature 25 of the relay will establish the contact 26 or the contact 27 or establish itself between the two.

If during the progress of the vehicle, the primary brushes 22, 22' enter into an insulated section of track and meet for example a potential difference U greater than $+u$, the relay 24 will establish the contact 27, start the motor 34, and the slider 29 will move in a direction such that the battery will pass into the rails 1—2 through the intermediary of the brushes 23, 23' a progressively increasing current which diminishes the difference of potential.

When U falls below $+u$ the auxiliary relay 24 comes back into the intermediate position between 27 and 28, the motor 34 stops and the slider 29 also; at this moment the track relay 5 has operated.

If, by chance, the slider 29 had gone too far, U would have been able to change its sign and to exceed $-u$, the relay 24 would then have reversed the motor 34 and brought back the slider 29 to the contact stud sought. If now the brushes pass away from the polarized track section considered and come on rails with no potential difference, the battery 10 alone passes current to the track—the potential difference between the rails then rapidly becomes substantially equal to $-U$; the relay 24 operates but in the reverse direction and the motor 34 brings back the slider 29 to the middle stud 33. At this moment the potential difference between the rails is neutralized and the motor 34 stops.

If, by chance, on leaving the track section under consideration one meets with a perfectly short circuiting track section (metal cross rails for example), it may be that the slider 29 will not return to the insulated block 33. It will continue then to pass into the track the current which it was previously passing, but the power passed remains so small that it is not necessary to consider it, and as soon as it ceases the short circuited track section, the slider will come back to the zero contact 33.

If the primary brushes meet on a section of track a potential difference where U less than $-u$, the relay 24 will establish the contact 27; the motor 34 and the slider 29 will be set in motion in a sense such that the battery 10 will pass to the rails a progressively increasing current which brings back the potential difference U to between $-u$ and $+u$ so as to permit the track relay 5 to operate.

It may be noted that the direct current motor controlling the movable member may be replaced by any other device (such as, for instance, the conventional "step by step" device used in automatic telephony) capable of moving the movable member swiftly.

In Figures 6 and 7, $B_1$ and $B'_1$ are brushes connected to the sensitive relay, $B_2$ and $B'_2$ the brushes connected to the source. The resistances $R_1$, $R_2$, $R_3$, $R_4$, are protective resistances which cannot be employed or be arranged in another manner.

In Figure 6, L is the self inductance and in Figure 7 C is the capacity used to obtain the progressive establishment of the current.

The operation is as follows:

Assuming the auxiliary relay to be applied to a contact stud, the electrical source of the vehicle is connected in a certain direction and passes to the track a progressively increasing current which tends towards a limit value. The potential difference between the rails (which is a function of this current and also of the presence on the track of batteries, resistances, and associated relays which may or may not exist at this point) begins to vary progressively. If the connection is well made, when the potential difference in question reaches the region of positive oscillation of the auxiliary relay, it reverses the latter and the source is at once connected in the opposite direction.

If a self inductance or a capacity is employed in both cases, the current passed to the track decreases progressively, is neutralized, changes its sign and again increases. The potential difference between the rails does likewise, but when it attains the negative value the relay oscillates a second time and the whole cycle commences again.

The emission of the current in one or the other direction is thus such in size and in duration, that the potential between the rails oscillates indefinitely between $+E$ and $-E$, E being the value for operation of the auxiliary relay. The relay of the railroad company which is controlled by the same potential difference and which is less sensitive than the auxiliary relay is thus released and actuates the signal.

Obviously this method of operation takes place also if there is no battery or associated relay, the auxiliary relay oscillating indefinitely between $\pm E$, but the current emitted is symmetrical if there is no battery, and asymmetrical if there is one.

In Figure 8, $B_1$, $B'_1$ are again brushes connected to the sensitive relay, $B_2$, $B'_2$ the brushes connected to the source. The protective resistances only remain.

The mechanism is thus different. Since there is neither self-inductance nor capacity (other than the self-inductance of the relay) the current immediately assumes its maximum value and the automatic regulation by the current intensity is no longer possible. Experiment proves however that the device is very effective. It is thought that regulation takes place by the duration of the relay armature on its contacts.

Figure 9 represents the modification in which in the place of an "oscillating" relay, two relays with rest contacts are used, which relays are sensitive to currents in the reverse direction, these two relays being combined with the application of a self inductance. In this figure $P_1$ and $P_2$ are the rest contacts of the auxiliary relays. Instead of a self inductance, this modification may comprise a capacity or may comprise neither a capacity nor self inductance. Another modification consists in utilizing a relay having a position of stable equilibrium between the two contacts, which is exactly equivalent to the system with two relays.

What is claimed is:

1. In a signaling system for railways in which the signals are controlled by relays associated with the different sections of the track and are fed by electric current, a device for causing the release of the said relays upon the passage of a vehicle over the rails of the track and comprising a source of direct current on the vehicle, a pair of brushes connected to the said source and engaging the rails of the track, a variable impedance connected in series with the said source, means controlling the said impedance, means alternately reversing the direction of flow of current from the said source to said brushes, a sensitive reversing relay controlling said reversing means, a second pair of brushes engaging the rails of the track and connected to said reversing relay, whereby, according to the polarity of the rails of the track, the armature of the reversing relay determines the means controlling the impedance to effect transmission to said rails from said source of direct current of a current tending to change the polarity of the rails until the difference of potential between the track relay becomes equal to zero and to thereby cause the release of the track relays.

2. In a signaling system for railways in which the signals are controlled by relays associated with the different sections of the track and are fed by a current of any nature, a device for causing the release of the said relays upon the passage of a vehicle over the rails of the track and comprising, on the vehicle, a source of direct current, a pair of brushes connected to the said source and rubbing on the rails of the track, a variable resistance connected in series with the said source, a moving member controlling the said resistance, means for producing rapid actuation of the said moving member in the one or the other of two opposite directions, a sensitive reversing relay controlling the said means, and a second pair of brushes rubbing on the rails of the track and connected to the said reversing relay, the arrangement being such that, according to the polarity of the rails of the track, the armature of the reversing relay determines the setting into motion of the moving member in the required direction for causing the transmission into the rails from the source of direct current, of a neutralizing current which increases until the difference of potential between the rails is equal to zero, which causes, at the same time, the release of the track relays, the return of the said armature to its neutral position, and the arrest of the said moving member.

3. In a signaling system for railways in which the signals are controlled by relays associated with the different sections of the track and fed by a current of any nature, a device for causing the release of the said relays upon the passage of a vehicle over the rails of the track and comprising, on the vehicle, a source of direct current, a pair of brushes connected to the said source and rubbing on to the rails of the track, an impedance connected in series with the said source and adapted to be reduced to zero to provide a progressive establishment of the current, a quick-acting and highly sensitive reversing relay for reversing alternately the direction of flow of current from the said source into the said brushes, and a second pair of brushes rubbing on the rails of the track and connected to the said relay, the arrangement being such that a predetermined polarity of the rails of the track immediately causes the flow into the said rails from the source of direct current of a current which gives to them an opposed polarity, and the reversing relay being then reversed the emission of a current restoring to the rails their original polarity and so on and thus causing the difference of potential between the terminals of the track relays to oscillate indefinitely in the neighborhood of zero, thereby causing the release of the said track relays.

4. In a system of signaling for railways in which the signals are controlled by relays associated with the different sections of the track and fed by a current of any nature, a device for causing the release of the said relays upon the passage of a vehicle over the rails of the track and comprising, on the vehicle, a source of direct current, a pair of brushes connected to the said source and rubbing on the rails of the track, an inductance connected in series with the said source and adapted to be reduced to zero to provide a progressive establishment of the current, two reversing relays each having a working contact and a back contact, the said relays being respectively sensitive to currents of opposite directions and being arranged to reverse alternately the direction of flow of current from the source of current into the said brushes, and a second pair of brushes rubbing on the rails of the track and connected to the said reversing relays, the arrangement being such that a predetermined polarity of the rails of the track immediately causes the flow into the said rails from the source of direct current, of a current which gives to them an opposed polarity, and the two reversing relays being then reversed the flow of a current restoring to the relays their original polarity and so on, and thus causing the difference in potential between the terminals of the track relays to oscillate indefinitely in the neighborhood of zero, thereby causing the release of the said track relays.

PIERRE MARCEL BOURDON.